United States Patent
Takala et al.

(10) Patent No.: US 6,770,207 B1
(45) Date of Patent: Aug. 3, 2004

(54) METHOD FOR THE LEACHING OF SOLID MATTER FROM SLUDGE

(75) Inventors: Heikki Takala, Pori (FI); Yrjö Oinonen, Kokkola (FI)

(73) Assignee: Outokumpu Oyj, Espoo (FI)

( * ) Notice: Subject to any disclaimer, the term of this patent is extended or adjusted under 35 U.S.C. 154(b) by 122 days.

(21) Appl. No.: 10/048,676

(22) PCT Filed: Aug. 10, 2000

(86) PCT No.: PCT/FI00/00681
§ 371 (c)(1),
(2), (4) Date: Jun. 10, 2002

(87) PCT Pub. No.: WO01/12307
PCT Pub. Date: Feb. 22, 2001

(30) Foreign Application Priority Data

Aug. 12, 1999 (FI) ................................................ 991719

(51) Int. Cl.⁷ .................................................. C02F 1/72
(52) U.S. Cl. ........................... 210/758; 75/335; 75/338; 210/765; 261/93
(58) Field of Search ................................ 210/629, 721, 210/738, 758, 194, 219, 220, 765; 261/93; 366/102–104, 327.1; 266/101; 75/335, 338, 339

(56) References Cited

U.S. PATENT DOCUMENTS

| | | | | |
|---|---|---|---|---|
| 3,236,744 A | * | 2/1966 | Yamaha | 435/295.1 |
| 4,058,481 A | * | 11/1977 | Futai et al. | 516/115 |
| 4,256,839 A | * | 3/1981 | Solomons et al. | 435/295.1 |
| 4,548,765 A | * | 10/1985 | Hultholm et al. | 261/93 |
| 4,571,090 A | * | 2/1986 | Weetman et al. | 366/270 |
| 4,648,973 A | * | 3/1987 | Hultholm et al. | 210/629 |
| 4,729,788 A | * | 3/1988 | Hutchins et al. | 423/27 |
| 4,955,482 A | * | 9/1990 | Elmore et al. | 209/17 |
| 5,006,320 A | * | 4/1991 | Reid et al. | 423/150.5 |
| 5,244,603 A | * | 9/1993 | Davis | 261/87 |
| 5,536,875 A | * | 7/1996 | Roby et al. | 562/412 |
| 5,925,290 A | * | 7/1999 | Hills | 261/36.1 |
| 6,576,041 B2 | * | 6/2003 | Cole | 75/744 |

* cited by examiner

Primary Examiner—Peter A. Hruskoci
(74) Attorney, Agent, or Firm—Morgan & Finnegan, LLP

(57) ABSTRACT

The invention relates to a method for the leaching of solid matter from a sludge with the aid of a gas containing oxygen, whereby the solid matter of the sludge is recirculated in a tall reactor equipped with a central pipe in the centre of the reactor and a double-action mixer located in the vicinity of the lower edge of the central pipe. A flow is formed with the aid of the mixer which sucks the sludge from the central pipe downward, and a gas to be conducted into the sludge in the bottom part of the reactor is dispersed in the form of small bubbles into the sludge outside the central pipe and the flow direction of the sludge is turned upwards in the outer casing of the reactor.

10 Claims, 2 Drawing Sheets

METHOD FOR THE LEACHING OF SOLID MATTER FROM SLUDGE

SUMMARY

Figure 1:
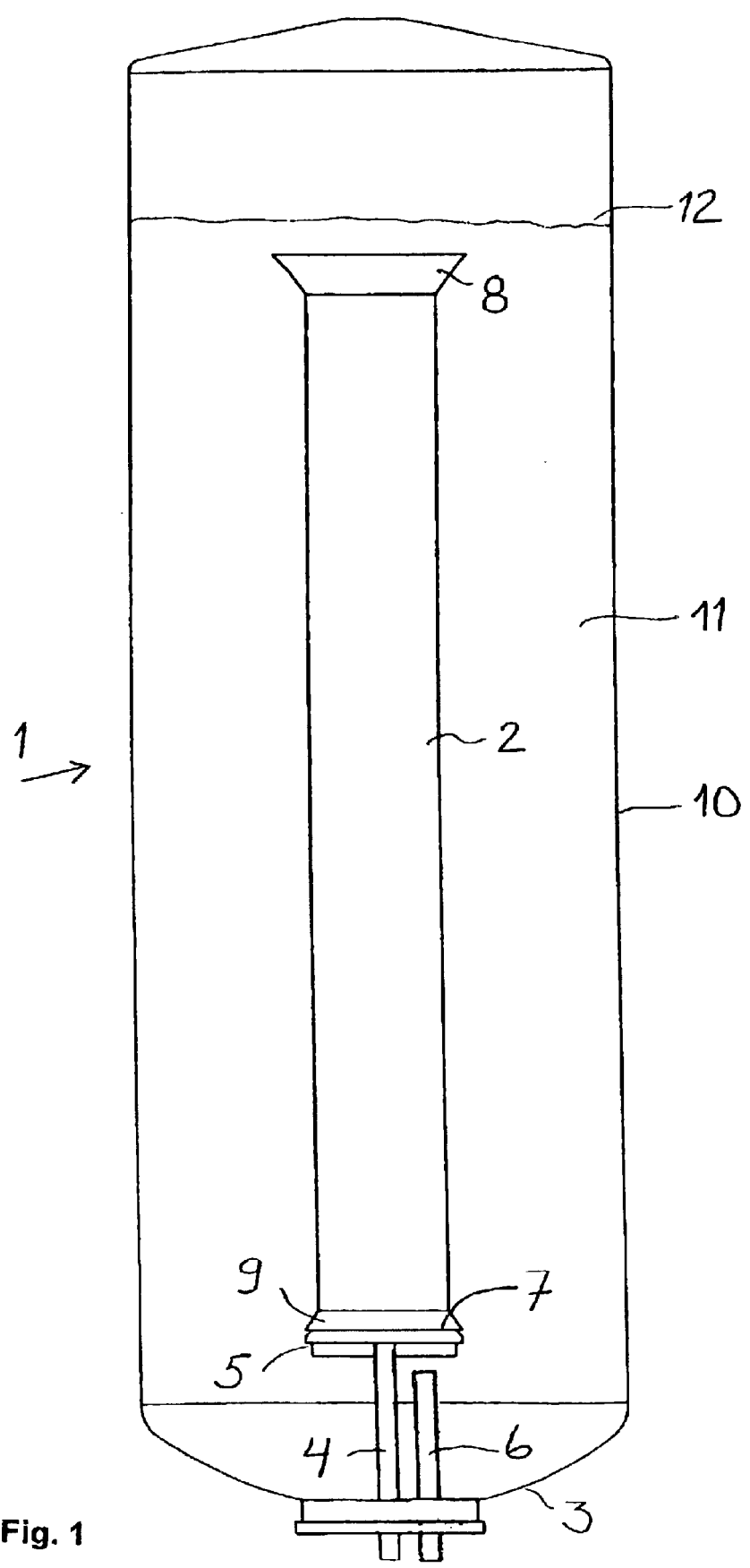

The invention relates to a method for the leaching of solid matter from a sludge with the aid of a gas containing oxygen, whereby the solid matter of the sludge is reticulated in a tall reactor equipped with a central pipe in the centre of the reactor and a double-action mixer located in the vicinity of the lower edge of the central pipe. A flaw is formed with the aid of the mixer which sucks the sludge from the central pipe downward, and a gas to be conducted into the sludge in the bottom part of the reactor is dispersed in the form of small bubbles into the sludge outside the central pipe; and the flow direction of the sludge is turned upwards in the outer casing of the reactor.

The present invention relates to a method for the leaching of solid matter from a sludge with the aid of a gas containing oxygen, whereby the solid matter of the sludge is recirculated in a tall reactor equipped with a central pipe in the centre of the reactor and a double-action mixer located in the vicinity of the lower edge of the central pipe. A flow is formed with the aid of the mixer which sucks the sludge from the central pipe downward, and a gas to be conducted into the sludge in the bottom part of the reactor is dispersed in the form of small bubbles into the sludge outside the central pipe and the flow direction of the sludge is turned upwards in the outer casing of the reactor.

In leaching of a sludge containing solid matter, such as for example metal concentrate, it is important that the participatory oxygen in the leaching, being introduced in the form of oxygen or gas containing oxygen, must firstly dissolve into the solid-containing sludge, in order that the oxygen can participate in the leaching reactions of the solid matter. A tall reactor is used for the improvement of the dissolution of the oxygen, whereupon, as compared to normal atmospheric reactors, great hydrostatic pressure forms at the bottom of the reactor (1.5–3.0 atm, i.e. 0.15–0.30 MPa), due to which the oxygen dissolves well in the reaction solution and thereby catalyses the dissolution of the solid matter.

In the prior art it is known for example U.S. Pat. No. 4,648,973, wherein the equipment concerns a reactor with a height many times greater than its diameter, inside which is located a concentric pipe. The sludge is fed into the upper part of the central pipe, as is the oxygen. For recirculation of the sludge, the central pipe is equipped with a mixer suspended from the top downwards, which pumps the sludge down the central pipe and the sludge then passes up through the space between the reactor and the internal pipe. The ratio between the diameters of the central pipe and outer pipe is between 0.4 and 0.85.

Now, the developed invention relates to a method for leaching of solid matter from a sludge, such as metal concentrate with the aid of oxygen containing gas whereby the sludge is recirculated in a tall reactor. The height of the reactor is many times greater than its diameter and the reactor is equipped with a concentric central pipe extending to the bottom part, a mixer being located in the vicinity of the lower part of the central pipe and a feeding member for gas containing oxygen. The shaft of the mixer extends upwards from the bottom of the reactor. A sludge flow turning downwards is achieved with the aid of the mixer. The gas containing oxygen to be fed underneath the mixer is dispersed into the sludge in the form of small bubbles and at the same time the flow direction of the sludge is turned in the bottom part of the reactor to ascend upwards. Reactions between the solid matter containing sludge and the oxygen containing gas happen mainly either in the bottom part of the reactor or in a casing part between the reactor walls and the central pipe. The essential features of the present invention are laid out in the enclosed claims.

As mentioned above, it is essential to the method that the mixer is located in the immediate vicinity of the lower edge of the central pipe, whereby the cross-section area of the discharge orifice remaining between the central pipe and the mixer is less than half the cross-section area of the central pipe, preferably at most one third of the cross-section area of the pipe. Thus the flow rate, from the central pipe, of the downward-flowing sludge increases at least twofold in comparison to the flow rate taking place in the central pipe. The nearer the mixer is located to the lower edge of the pipe, the better the suction building up to the central pipe. In practice the limit is set by the tolerances, which result from the wearing of the shaft and from the flexibility and dimensioning of the other parts. At the aforementioned cross-sectional area ratio, such a flow rate is achieved that the downward-directed solution flow is faster than the ascending rate of the gas bubbles, and the upward flow rate of the solution in the annular casing of the reactor is greater than the settling rate of the particles of the solid matter.

The mixer used in the method according to the invention is of double-action, it is formed of two parts having an essentially horizontal plate between them. Curved blades are fixed above the horizontal plate which suck sludge downward in the central pipe. The blades fixed underneath the horizontal plate form a straight-bladed turbine mixer. As the gas containing oxygen is fed underneath the mixer installed in the bottom part of the reactor, the lower part of the mixer disperses the feed gas into very small bubbles, thus assisting the dissolution of the gas into the sludge. As the gas is fed into the sludge at the bottom part of the reactor, the gas bubbles moving with the sludge flow have as long a residence and reaction time in the sludge as possible, before they reach the surface or descend with the flow to be recirculated through the central pipe or are discharged through outlet means in the upper part of the reactor.

Figure 2:
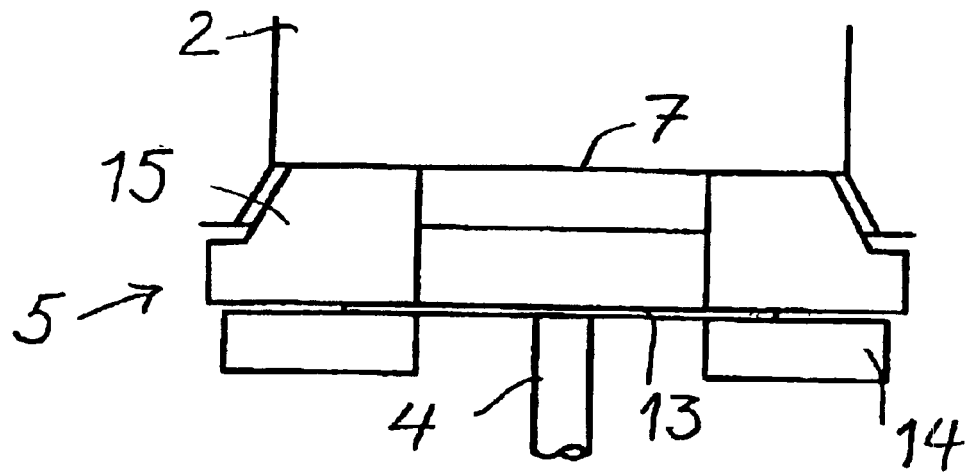
Figure 3:
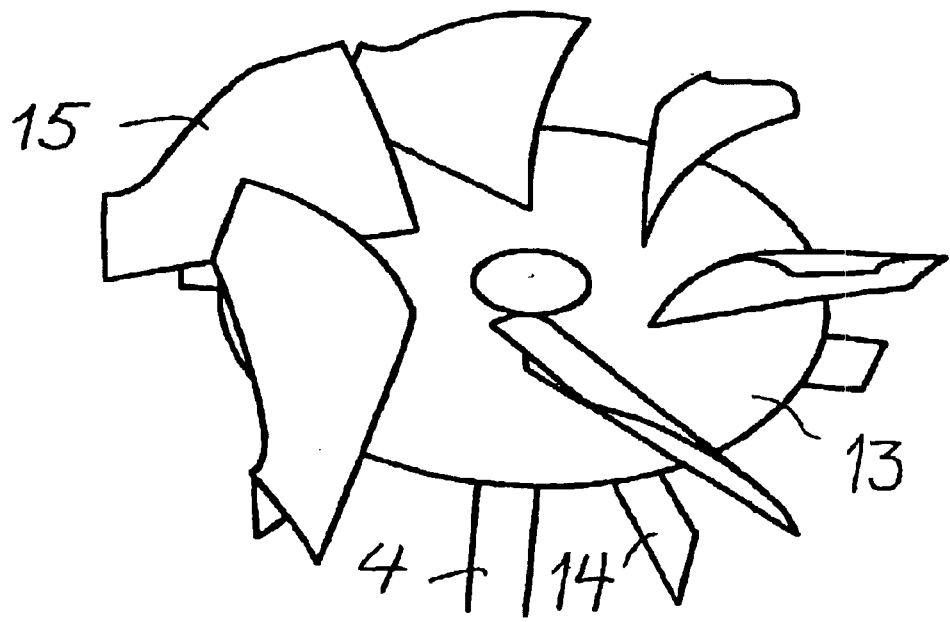

The equipment for carrying out the method according to the invention is explained in more detail with the aid of the enclosed figures, wherein FIG. 1 shows a vertical section of the reactor, in FIG. 2 a vertical section of the reactor is shown at the point of the central pipe and mixer, and FIG. 3 shows a three-dimensional picture of the reactor mixer.

For the leaching of sludge containing solid matter, FIG. 1 shows a tubular reactor 1, equipped with a concentric central pipe 2, which extends to the bottom part of the reactor. The distance of the central pipe from the reactor bottom is at range between 0.2–1.0 times the reactor diameter preferably between 0.314 0.5. The surface area ratio between the central pipe and the casing of the reactor surrounding it is below 0.1. Upward from a reactor bottom 3 is a mixer 5 supported by its shaft 4, and a feed member 6 for gas containing oxygen. As the inlet of the mixer shaft is in the lower part of the reactor, the shaft can be made to be as short and as sturdy as is possible.

The mixer is concentric with the pipe 2 and is located in very close proximity to a lower edge 7 of the central pipe. As seen in the figure, the central pipe 2 can be equipped at the upper and lower ends with conical extensions 8 and 9. According to the figure the mixer can also be placed partly inside the 10 central pipe. The annular space between reactor walls 10 and central pipe 2 can be designated as a casing 11. When necessary the lower part of the central pipe can be equipped with baffles (not illustrated). The sludge feed to the reactor can be fed in a conventional manner for example to the central pipe and the solution can be removed for example as overflow or the sludge can be preferable fed and discharged via its own means under a sludge surface 12. The inlet and outlet means are not illustrated in more detail in the figure.

As can be seen from FIGS. 2 and 3, the mixer 5 comprises the mixer shaft 4, to which is fixed a horizontal plate 13, below which are attached straight lower blades 14 and above which are attached curved upper blades 15. The horizontal plate of the mixer impedes the flow of sludge from above the mixer to below it and vice versa. The horizontal plate can be circular or angular. Both the lower blades 14 and upper blades 15 are fixed to the horizontal plate 13 of the mixer in an essentially vertical manner. The lower blades are nearly rectangular and their task is to disperse the oxygen gas fed underneath the mixer as well as possible into the sludge and to bring about a vertically rotating flow at the bottom of the reactor, thereby preventing the solid matter contained in the sludge from settling to the bottom of the reactor. A well-mixed area, of a height about the same as the diameter of the reactor, thus forms at the bottom part of the reactor.

The lower parts of the upper blades are preferably of rectangular form, but the upper part smoothly tapered. The curved upper blades bring about the downward flow in the central pipe and the lower blades the upward return flow to the casing 11 of the reactor, in other words between walls 10 and central pipe 2. In FIG. 2 it can also be seen that in this case the mixer is installed at such a height that upper blades 15 partly extend into the inside of the central pipe.

The benefits gained from the method according to the present invention can be listed among the following facts: An efficient mixing is performed to the sludge only in the lower part of the reactor where the oxygen containing gas is also fed, and so both the mixing energy which promotes dissolution of the solid matter of the sludge and the energy which is needed for recirculation are brought to the sludge at the same time and then the total energy needed is lower than conventionally. In the method, there is formed firstly a downward sucking flow to the central pipe and secondly a flow which turns the sludge flow from the bottom part of the reactor upwards and at the same time mixes the oxygen-containing gas to the sludge and prevents the particles of the solid matter to settle.

What is claimed is:

1. A method for leaching of solid matter from a sludge of metal concentrate aided by a gas containing oxygen, comprising leaching the solid matter from the sludge in a tubular reactor, with a height at least two times greater than its diameter and which is equipped with a concentric central pipe and a double action mixer having upper blades and lower blades, forming a downward directed sludge flow in the central pipe with the aid of upper-curved blades of the mixer, the mixer being located upward from the bottom of the reactor in the immediate vicinity of the lower edge of the central pipe, turning the direction of sludge flow outside the central pipe in the bottom part of the reactor to an upward flow while feeding and dispersing an oxygen-containing gas into the sludge in the form of small bubbles to prevent solid matter in the sludge from settling to the bottom of the reactor.

2. A method according to claim 1, further comprising increasing the flow rate of the sludge discharging from the central pipe at least twofold in comparison to the flow rate of the sludge inside the central pipe.

3. A method according to claim 1, further comprising adjusting the cross-section area remaining between the mixer and the central pipe to be less than half of the cross-section area in the central pipe.

4. A method according to claim 3, wherein the cross-section area remaining between the mixer and the central pipe is adjusted to be at most one third of the cross-section area in the central pipe.

5. A method according to claim 1, wherein the flow rate of the sludge descending in the central pipe is faster than the ascending rate of the gas bubbles dissolved in the the sludge.

6. A method according to claim 1, wherein the flow rate of the sludge ascending in a casing of the reactor is greater than the settling rate of the particles of the solid matter.

7. A method according to claim 1, further comprising dispersing the oxygen-containing gas into the sludge and turning the sludge flow upwards using lower, nearly rectangular and straight blades of the mixer.

8. A method according to claim 1, wherein the lower edge of the central pipe is at a height from the reactor bottom, which is 0.7–1.3 times that of the diameter of the reactor.

9. A method according to claim 8, wherein the lower edge of the central pipe is at a height from the reactor bottom which is the same as the diameter of the reactor.

10. A method according to claim 1, wherein the cross-section ratio of the central pipe and its surrounding reactor casing is under 0.1.

\* \* \* \* \*